3,445,907
ROLLER RETAINING METHOD FOR ROLLER BEARING SEPARATORS
Daniel F. Greby, Buena Park, Calif., assignor to Industrial Tectonics, Inc., Ann Arbor, Mich., a corporation of Michigan
Filed Feb. 16, 1967, Ser. No. 616,668
Int. Cl. B21h *1/12;* B21d *53/12;* B23p *13/02;* F16c *33/46*
U.S. Cl. 29—148.4                          4 Claims

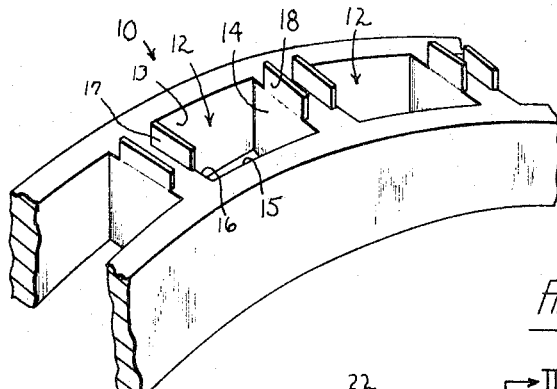
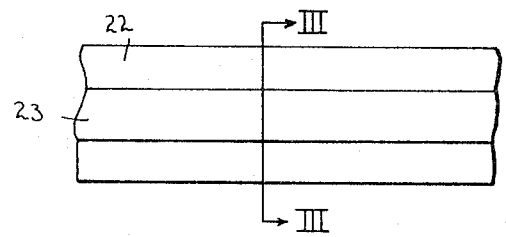
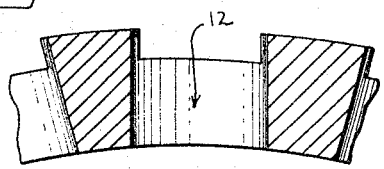
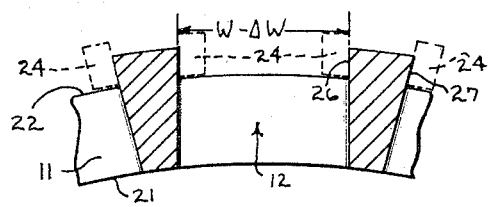
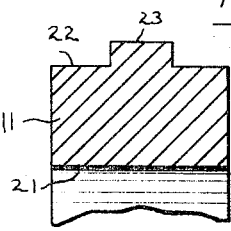
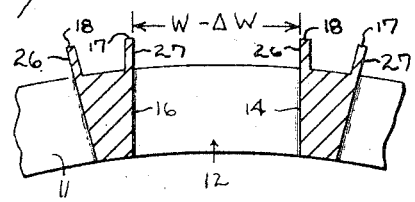
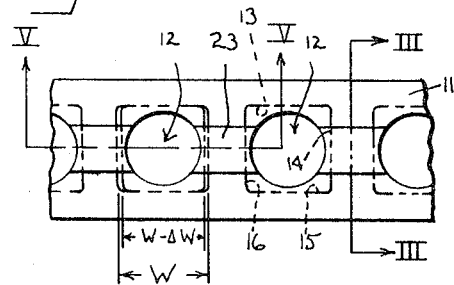
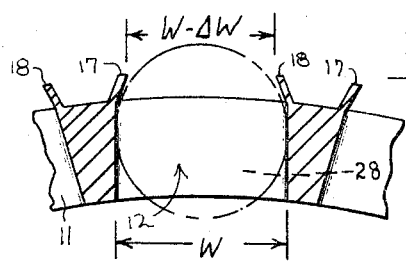
INVENTOR.
DANIEL F. GREBY United States Patent Office 3,445,907
Patented May 27, 1969

ABSTRACT OF THE DISCLOSURE

A method of making roller bearing pockets in a solid ring retainer, which comprises the steps of first providing a solid ring having an external, circumferential rib thereon, then drilling circular openings radially from one side to the other side of the solid ring spaced circumferentially along the central circumference of the ring, then broaching the ring to form the circular openings into openings each having planar sides and having its circumferential sides spaced a distance slightly less than the diameter of said roller, then restraining the circumferential ends of the rib portion and removing the central portion between the restrained ends leaving tabs having sides facing said openings coplanar with said circumferential sides of said openings, then burnishing said openings into an opening having its circumferential sides spaced a distance slightly greater than the diameter of said roller so that the surface of a bearing is tangent to said circumferential sides.

---

The purpose of this invention is to overcome the manufacturing objection of ball or roller retainers now made wherein the retaining means are formed by a process of moving metal commonly known as the process of cold working metal. To permit this, the cages or retainers are manufactured from malleable metals such as bronzes and soft steel inasmuch as these types of metals permit bending and deforming of the cages without causing rupture of the metal of the deformed part. For example, in some types of retainers, tabs or projections extend over the space in which the roller is located. The bending of these tabs is done after the roller is placed in the space. The malleability of the metals permits bending without rupturing the metal and without the necessity of performing any subsequent heat treatment of the cage or the retainer.

However, for many uses, as where bearings are operated for long periods of time and/or at relatively high speeds and temperatures, harder and more wear resistant metals are required for the cages and retainers. In these cases the former methods for forming tabs on the cages for the retention of the rollers therein are unacceptable because the hardness and consequent lower ductility of the metals involved cause the tabs either to crack in the manufacturing operation or to develop microscopic cracks which cause subsequent failure of the bearing in operation. Thus, a need has long existed for a better method particularly applicable to materials of low ductility, of creating bearing retention means on the cages and retainers which do not result in subsequent bearing failure and can be performed at a relatively low cost of manufacturing.

Accordingly, it is an object of this invention to provide in an inexpensive manner a method for manufacturing trouble-free roller bearing retainers of material having a low ductility.

Another object of the invention is to provide a method for creating tabs on bearing retainers of material having a low ductility without having to perform a bending operation thereon and risking resultant ruptures.

It is a further object of the invention to provide bearing pockets having planar surfaces for low friction operation of the bearings within the bearing pockets.

Other objects and purposes of the invention will become apparent to persons acquainted with methods of manufacturing of this general type upon reading the following disclosure and inspecting the accompanying drawings.

In the drawings:

FIGURE 1 is a perspective view of a portion of a bearing retainer embodying the invention.

FIGURE 2 is a planar view of a portion of the solid ring before any machining has been performed thereon.

FIGURE 3 is a sectional view taken along line III—III in FIGURE 2.

FIGURE 4 is a planar view of a portion of the bearing retainer shown in FIGURE 1 illustrating the appearance of the retainer after the drilling operation and before the broaching operation.

FIGURE 5 is a sectional view taken along the central line V—V in FIGURE 4 illustrating the cross section of the opening after the drilling operation.

FIGURE 6 is the same as FIGURE 5 and illustrates the cross section of the bearing opening subsequent to the broaching operation.

FIGURE 7 is the same as FIGURE 5 and illustrates the cross section of the bearing opening subsequent to the removal of metal resulting in the formation of bearing retention tabs.

FIGURE 8 is the same as FIGURE 5 and illustrates the cross section of a finished bearing pocket.

Detailed description

A bearing retainer 10 (FIGURE 1) here for illustrative purposes shown as a roller bearing retainer, comprises an annular solid ring 11 having a plurality of circumferentially spaced, radially directed pockets 12 positioned around the periphery of the ring along the central or median line. The pockets 12 are preferably rectangularly shaped having four planar side walls 13, 14, 15 and 16. Side walls 14 and 16 are preferably parallel to the axis of the ring 11 and are spaced a distance only slightly greater than the diameter of a bearing which is to be placed into the pockets.

Tab means 17 and 18 are positioned on the radially outward surface of the ring 10 adjacent the circumferential walls 14 and 16 and project over and into the pockets 12 as illustrated in FIGURE 8 to prevent a bearing 27 (dotted lines) escaping radially outwardly therefrom.

Method of manufacture

The method of manufacturing a one-piece bearing retainer is illustrated by referring to the drawings. A solid circular ring 11 comprises inner and outer surfaces 21 and 22, respectively, and a raised rib 23 extending around the outer surface 22 of the ring 11.

A plurality of circumferentially spaced circular openings 12 are drilled radially through the solid ring 11 along the central, or median, line of the ring. The ring is then subjected to a broaching operation which is carried out so that the horizontal cross section of the opening 12 is changed to a substantially rectangular pocket having four planar surfaces and having a spacing between the circumferential side walls 14 and 16 of $W - \Delta W$. The spacing between the axial side walls 13 and 15 of the pockets 12 equals substantially the length of a roller plus a reasonable clearance.

After the bearing retainer has been provided with the desired number of pockets of the configuration just described, a restraining apparatus 24 of any conventional type, such as a clamp or vise illustrated in broken lines in FIGURE 6, is placed against the circumferential ends 26 and 27 of the rib segments 23. The central portion of said rib segments 23 between the restrained ends 26 and 27, is removed as indicated in FIGURE 7 leaving tabs 17 and 18 having the circumferential end walls 26 and 27 facing the pockets 12 and coplanar with the circumferential side walls 14 and 16. The thickness of the tabs 17 and 18 is preferably the same over the length of the tabs.

The ring 11 is then subjected to a burnishing operation which cold works the metal circumferentially so that the spacing $W-\Delta W$ between the circumferential side walls 14 and 16 is increased to a distance $W$. However, while, as stated, the burnishing operation increases the circumferential spacing of the ends 14 and 16, this operation does not permanently increase the circumferential spacing of the radially outer ends of the tabs appreciably. Hence, these remain spaced circumferentially a distance $W-\Delta W$ so that they project over the pockets 12 and thereby prevent the bearing 28 (dotted lines in FIGURE 8) escaping radially outwardly therefrom.

The following is offered as a possible explanation of the phenomenon of the tabs 17 and 18 remaining spaced circumferentially a distance $W-\Delta W$ and it is not intended to be limiting in any respect. The tabs 17 and 18 both have a thin cross section. As the cold working or burnishing tool passes by the tabs, they tend to flex circumferentially to conform to the width of the burnishing tool, namely, the width $W$. After the tool has passed through the pockets 12, the tabs 17 and 18 will return, at their radially outermost ends, to the dimension $W-\Delta W$ due to the elasticity of the material but the heavier or thicker cross section comprising the body of the ring between the openings does not spring back appreciably, if at all. Apparently, the burnishing tool packs the surface material more densely and permanently in the thick or heavy portion of the ring while the thinner sections of the tabs yield elastically and then return to, or practically to, their original condition. Although this may appear to violate the laws of elasticity of materials, the result has been definitely observed and the illustration in FIGURE 8 accurately shows the cross section of a finished opening 12 obtained by the above-designated process.

While a particular preferred embodiment of the invention has been described hereinabove, it will be understood that the invention includes such modifications or changes therein as lying within the scope of the appended claims.

The embodiments of the invention in which an exclusive property or privilege is claimed are defined as follows:

1. A method for manufacturing bearing pockets in a solid ring, said ring having a raised rib on a surface of said ring along the external circumferential line thereof, comprising the steps:
    forming a plurality of radial circular first openings through said solid ring and spaced circumferentially along said rib;
    forming said circular openings into second openings having planar sides and ends and having their circumferential ends spaced a distance slightly less than the diameter of the bearing to be received into said pockets;
    removing the central portion of said rib between said circumferentially facing ends leaving tabs having sides facing said openings and coplanar with said circumferential ends of said second openings;
    enlarging the sides and ends of said second openings into bearing pockets having planar sides and ends and having their circumferential ends spaced substantially the distance of the diameter of said bearing while leaving said tabs spaced at their outermost ends a distance slightly less than the diameter of said bearings to retain said bearings within said pockets.

2. The method defined in claim 1 including the step wherein the circumferentially facing ends of a given remaining segment of said rib are restrained during the removal of said central portion between said circumferentially facing ends whereby circumferential displacement of said circumferentially facing ends is prevented.

3. The method defined in claim 1 wherein the step forming said circular openings into second openings having planar sides is a broaching step.

4. The method defined in claim 1 wherein the step forming said second openings into bearing pockets is a burnishing step.

References Cited

UNITED STATES PATENTS

| | | |
|---|---|---|
| 1,983,134 | 12/1934 | Johnson. |
| 2,327,237 | 8/1943 | Baden. |
| 2,657,106 | 10/1953 | Lovell et al. _____ 308—217 |
| 2,765,518 | 10/1956 | Lovell et al. _____ 291—558 X |
| 2,876,529 | 3/1959 | Palmgren. |
| 2,897,582 | 8/1959 | Blazek et al. |
| 2,933,803 | 4/1960 | Schaeffler. |

THOMAS H. EAGER, *Primary Examiner.*

U.S. Cl. X.R.

29—558; 308—217